(12) United States Patent
Chigira (10) Patent No.: US 11,017,947 B2
(45) Date of Patent: May 25, 2021

(54) MULTILAYER CERAMIC CAPACITOR AND MANUFACTURING METHOD OF MULTILAYER CERAMIC CAPACITOR

(71) Applicant: TAIYO YUDEN CO., LTD., Tokyo (JP)

(72) Inventor: Noriyuki Chigira, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 146 days.

(21) Appl. No.: 16/412,193

(22) Filed: May 14, 2019

(65) Prior Publication Data

US 2019/0355517 A1 Nov. 21, 2019

(30) Foreign Application Priority Data

May 18, 2018 (JP) .............................. JP2018-096107

(51) Int. Cl.
*H01G 4/12* (2006.01)
*H01G 4/30* (2006.01)
*H01G 13/00* (2013.01)
*H01G 4/008* (2006.01)
*H01G 4/01* (2006.01)

(52) U.S. Cl.
CPC .............. *H01G 4/1227* (2013.01); *H01G 4/30* (2013.01); *H01G 13/00* (2013.01); *H01G 4/0085* (2013.01); *H01G 4/01* (2013.01)

(58) Field of Classification Search
None
See application file for complete search history.

(56) References Cited

U.S. PATENT DOCUMENTS

| 10,290,424 | B2* | 5/2019 | Yanagisawa | H01G 4/30 |
| 10,304,626 | B2* | 5/2019 | Ueda | H01G 4/30 |
| 10,672,558 | B2* | 6/2020 | Morita | H01G 4/232 |
| 2008/0304204 | A1 | 12/2008 | Suzuki | |
| 2016/0189865 | A1 | 6/2016 | Kawamura et al. | |
| 2016/0217924 | A1 | 7/2016 | Morita et al. | |
| 2017/0032894 | A1 | 2/2017 | Kawamura et al. | |
| 2017/0032895 | A1 | 2/2017 | Ogata et al. | |
| 2018/0174752 | A1* | 6/2018 | Yanagisawa | H01G 4/30 |
| 2018/0315549 | A1* | 11/2018 | Ueda | H01G 4/30 |
| 2019/0027311 | A1* | 1/2019 | Chigira | H01G 4/30 |
| 2019/0378655 | A1* | 12/2019 | Iwai | H01G 4/012 |
| 2019/0385794 | A1* | 12/2019 | Yanagisawa | H01G 4/1245 |

FOREIGN PATENT DOCUMENTS

| JP | 2004096010 A | 3/2004 |
| JP | 2010103566 A | 5/2010 |
| JP | 2016127120 A | 7/2016 |
| JP | 2016139720 A | 8/2016 |
| JP | 2017028224 A | 2/2017 |
| JP | 2017028225 A | 2/2017 |

* cited by examiner

*Primary Examiner* — Dion Ferguson
(74) *Attorney, Agent, or Firm* — Law Office of Katsuhiro Arai (57) ABSTRACT

A multilayer ceramic capacitor includes: a multilayer structure in which each of a plurality of dielectric layers and each of a plurality of internal electrode layers are alternately stacked, wherein concentrations of Mn, Si and B of a margin region are respectively higher than concentrations of Mn, Si and B of the dielectric layers, wherein a donor element concentration of the margin region is lower than a donor element concentration of the dielectric layers, wherein the margin region is at least one of an end margin region and a side margin region.

12 Claims, 5 Drawing Sheets

MULTILAYER CERAMIC CAPACITOR AND MANUFACTURING METHOD OF MULTILAYER CERAMIC CAPACITOR

CROSS-REFERENCE TO RELATED APPLICATION

This application is based upon and claims the benefit of priority of the prior Japanese Patent Application No. 2018-096107, filed on May 18, 2018, the entire contents of which are incorporated herein by reference.

FIELD

A certain aspect of the present invention relates to a multilayer ceramic capacitor and a manufacturing method of the multilayer ceramic capacitor.

BACKGROUND

Recently, electronic devices such as smart phones or mobile phones are being downsized. Thereby, electronic components mounted on the electronic devices are rapidly being downsized. For example, in a field of a multilayer ceramic capacitor, thicknesses of dielectric layers and internal electrodes are reduced in order to reduce a chip size.

When the thickness of the dielectric layer is reduced, a voltage applied to each dielectric layer increases. In this case, a lifetime of the dielectric layer may be shortened. And, reliability of the multilayer ceramic capacitor may be degraded. And so, there are disclosed technologies in which a donor element such as Mo (molybdenum), Nb (niobium), Ta (tantalum) or W (tungsten) is added to the dielectric layer (for example, see Japanese Patent Application Publications No. 2016-127120, No. 2016-139720, No. 2017-028224 and No. 2017-028225).

When the thickness of the dielectric layer is reduced, the number of the dielectric layers increases. For example, the multilayer ceramic capacitor has a structure in which each of dielectric layers and each of internal electrode layers are alternately stacked. However, the internal electrode layer does not cover the whole of the dielectric layer in order that the internal electrode is not exposed to the side face of the chip. In this case, the internal electrode layer only extends to inside of a circumference of the dielectric layer. Therefore, a level difference occurs between a capacity region in which the dielectric layers and the internal electrode layers are alternately stacked and a side margin region in which the dielectric layers are stacked without sandwiching the internal electrode layers. And, when the number of the dielectric layers increases, a structural defect such as delamination easily occurs because of the level difference.

As a method of solving the problem, there is disclosed a method in which the level difference is absorbed by printing an internal electrode pattern on a ceramic green sheet and printing a reverse pattern of ceramic paste on a part of the green sheet where the internal electrode pattern is not printed.

However, with the method, a micro clearance may occur between an end of the internal electrode layers and the side margin region because of a difference of contraction in sintering between the capacity region and the side margin region. In this case, a water component such as moisture intrudes into the clearance and humidity resistance is degraded. Therefore, high reliability may not be necessarily achieved.

And so, there is disclosed a method in which the difference of contraction in sintering is reduced by covering ceramic powder used for a ceramic green sheet for absorbing the level difference, with a glass film (for example, see Japanese Patent Application Publication No. 2004-96010). And, there is disclosed a method in which humidity resistance is improved by increasing a Mg concentration of a gap on the side of a face side more than a Mg concentration of an effective layer portion contributing a capacity (for example, see Japanese Patent Application Publication No. 2010-103566).

SUMMARY OF THE INVENTION

However, it is not possible to sufficiently improve the reliability with the above-mentioned methods.

The present invention has a purpose of providing a multilayer ceramic capacitor and a manufacturing method of the multilayer ceramic capacitor that are capable of sufficiently improving reliability thereof.

According to an aspect of the present invention, there is provided a multilayer ceramic capacitor including: a multilayer structure in which each of a plurality of dielectric layers and each of a plurality of internal electrode layers are alternately stacked, a main component of the dielectric layers being ceramic, the multilayer structure having a rectangular parallelepiped shape, the plurality of internal electrode layers being alternately exposed to a first end face and a second end face of the multilayer structure, the first end face facing with the second end face, wherein concentrations of Mn, Si and B of a margin region with respect to a main component ceramic of the margin region are respectively higher than concentrations of Mn, Si and B of the dielectric layers in the multilayer structure with respect to a main component ceramic of the dielectric layers in the multilayer structure, wherein a donor element concentration of the margin region with respect to the main component ceramic of the margin region is lower than a donor element concentration of the dielectric layers in the multilayer structure with respect to the main component ceramic of the dielectric layers in the multilayer structure, wherein the margin region is at least one of an end margin region and a side margin region, wherein, in the multilayer structure, the end margin region is a region in which internal electrode layers exposed to the first end face are facing with each other without sandwiching an internal electrode layer exposed to the second end face and a region in which internal electrode layers exposed to the second end face are facing with each other without sandwiching an internal electrode layer exposed to the first end face, wherein, in the multilayer structure, the side margin is a region covering edge portions to which the plurality of internal electrode layers extend toward two side faces other than the first end face and the second end face.

According to another aspect of the present invention, there is provided a manufacturing method of a multilayer ceramic capacitor including: a first process of providing a first pattern of metal conductive paste, on a green sheet including main component ceramic grains; a second process of making a stack unit by providing a second pattern of main component ceramic grains, around the first pattern on the green sheet; and a third process of stacking a plurality of the stack units formed in the second process so that positions of the first patterns are alternately shifted to each other and firing a ceramic multilayer structure of the stack units, wherein concentrations of Mn, Si and B of the second pattern with respect to a main component ceramic of the second pattern are respectively higher than concentrations of Mn, Si and B of the green sheet with respect to a main component ceramic of the green sheet, wherein a donor element concentration of the second pattern with respect to the main component ceramic of the second pattern is lower than a donor element concentration of the green sheet with respect to the main component ceramic of the green sheet.

DETAILED DESCRIPTION

A description will be given of an embodiment with reference to the accompanying drawings.

Figure 1:
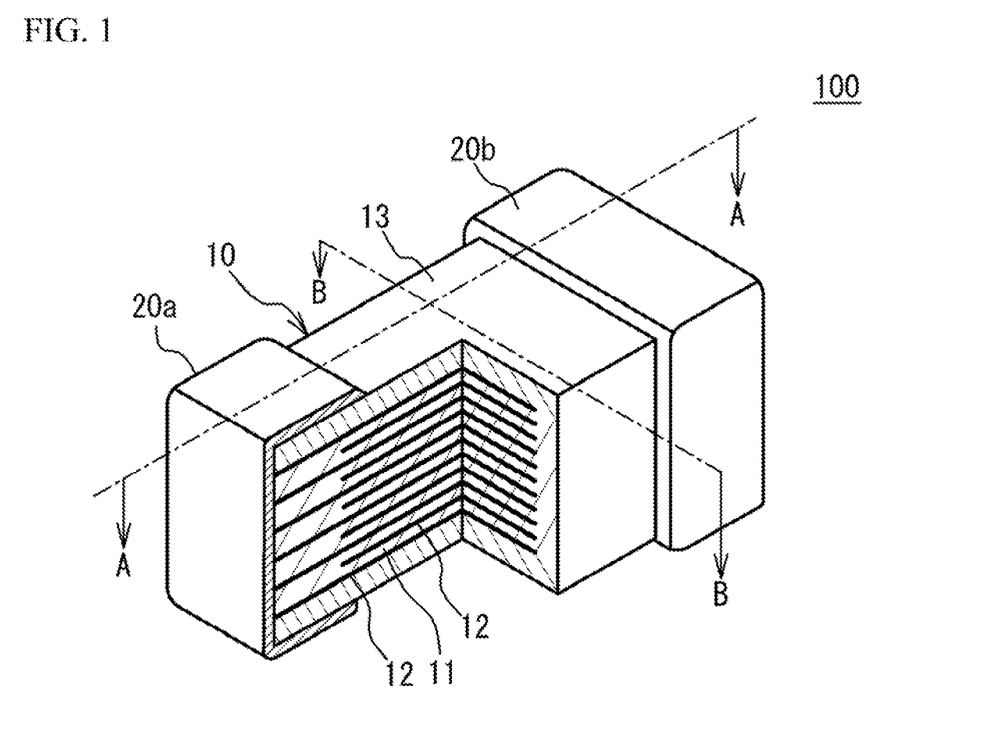
FIG. 1 illustrates a partial perspective view of a multilayer ceramic capacitor.
Figure 2:
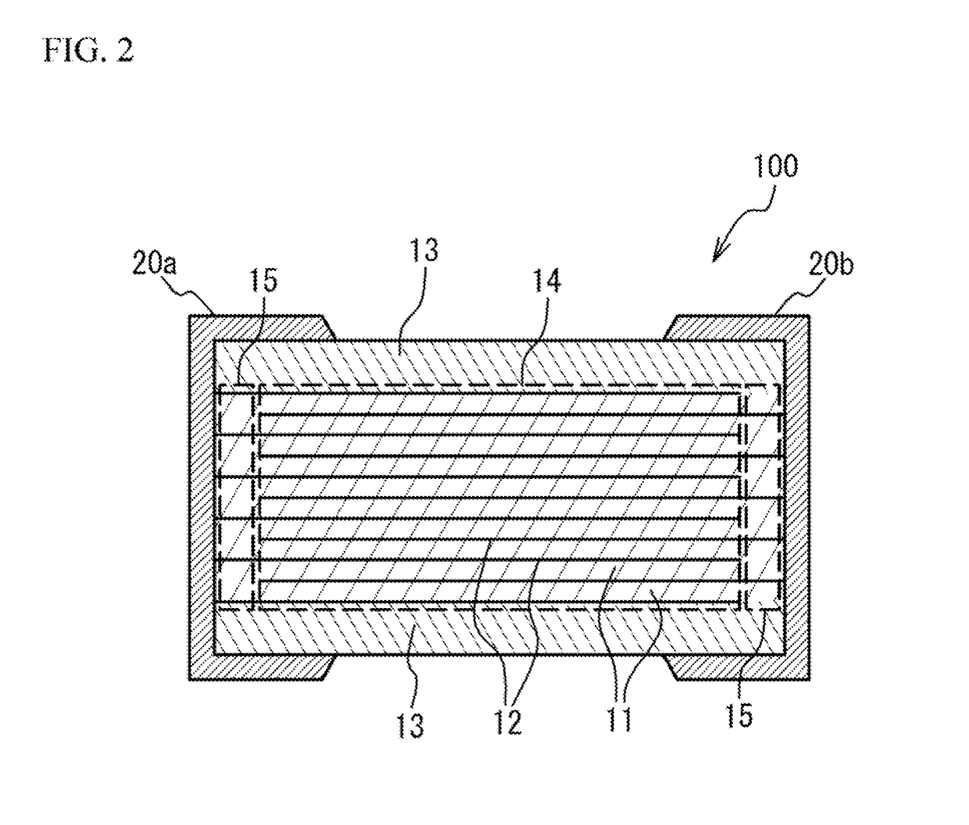
FIG. 2 illustrates a cross sectional view taken along a line A-A of FIG. 1.
Figure 3:
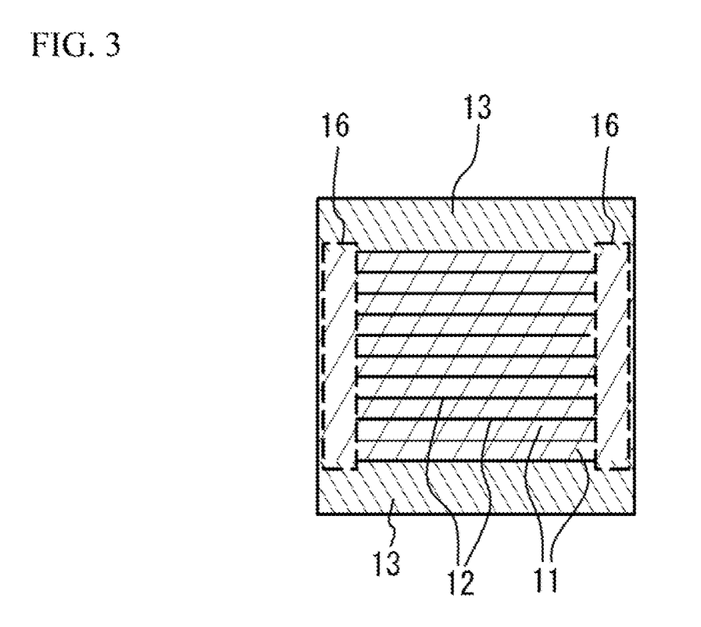
FIG. 3 illustrates a cross sectional view taken along a line B-B of FIG. 1.

(Embodiment) FIG. 1 illustrates a partial perspective view of a multilayer ceramic capacitor 100 in accordance with an embodiment. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face faces with the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, the internal electrode layer 12 is positioned at an outermost layer in a stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiOZ_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

As illustrated in FIG. 2, a region, in which a set of the internal electrode layers 12 connected to the external electrode 20a face another set of the internal electrode layers 12 connected to the external electrode 20b, is a region generating electrical capacity in the multilayer ceramic capacitor 100. And so, the region is referred to as a capacity region 14. That is, the capacity region 14 is a region in which the internal electrode layers 12 next to each other being connected to different external electrodes face each other.

A region, in which the internal electrode layers 12 connected to the external electrode 20a face with each other without sandwiching the internal electrode layer 12 connected to the external electrode 20b, is referred to as an end margin region 15. A region, in which the internal electrode layers 12 connected to the external electrode 20b face with each other without sandwiching the internal electrode layer 12 connected to the external electrode 20a is another end margin region 15. That is, the end margin region 15 is a region in which a set of the internal electrode layers 12 connected to one external electrode face with each other without sandwiching the internal electrode layer 12 connected to the other external electrode. The end margin region 15 is a region that does not generate electrical capacity in the multilayer ceramic capacitor 100.

As illustrated in FIG. 3, a region of the multilayer chip 10 from the two sides thereof to the internal electrode layers 12 is referred to as a side margin region 16. That is, the side margin region 16 is a region covering edges of the stacked internal electrode layers 12 in the extension direction toward the two side faces.

Figure 4A:
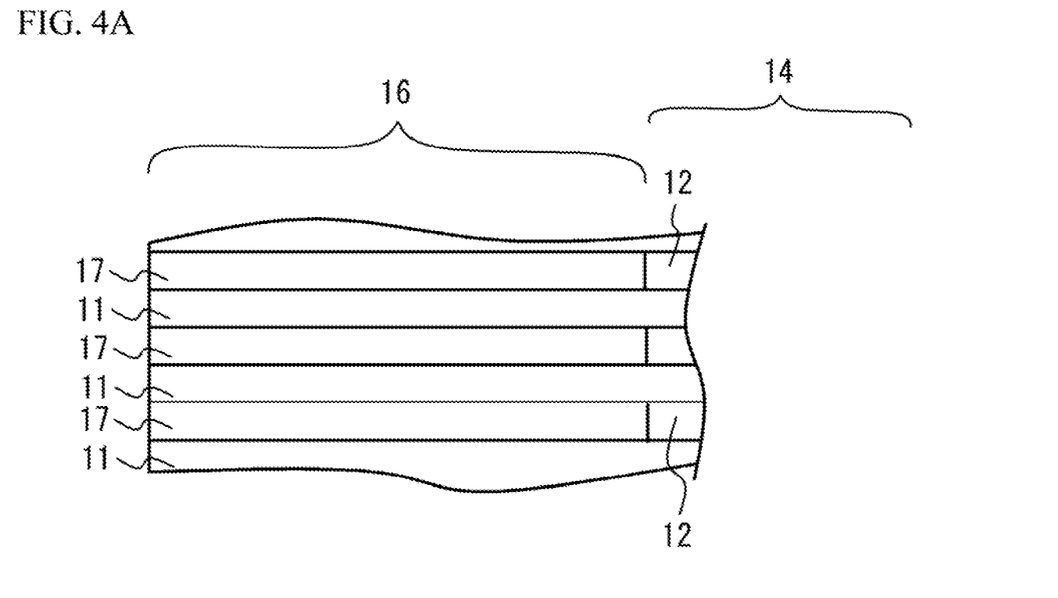
FIG. 4A illustrates an enlarged view of a cross section of a side margin region.

FIG. 4A illustrates an enlarged view of the cross section of the side margin region 16. The side margin region 16 has a structure in which the dielectric layer 11 and a reverse pattern layer 17 are alternately stacked in a stacking direction of the dielectric layer 11 and the internal electrode layer 12 in the capacity region 14. Each of the dielectric layers 11 of the capacity region 14 are continuously formed with each of the dielectric layers 11 of the side margin region 16. With the structure, a level difference between the capacity region 14 and the side margin region 16 is suppressed.

Figure 4B:
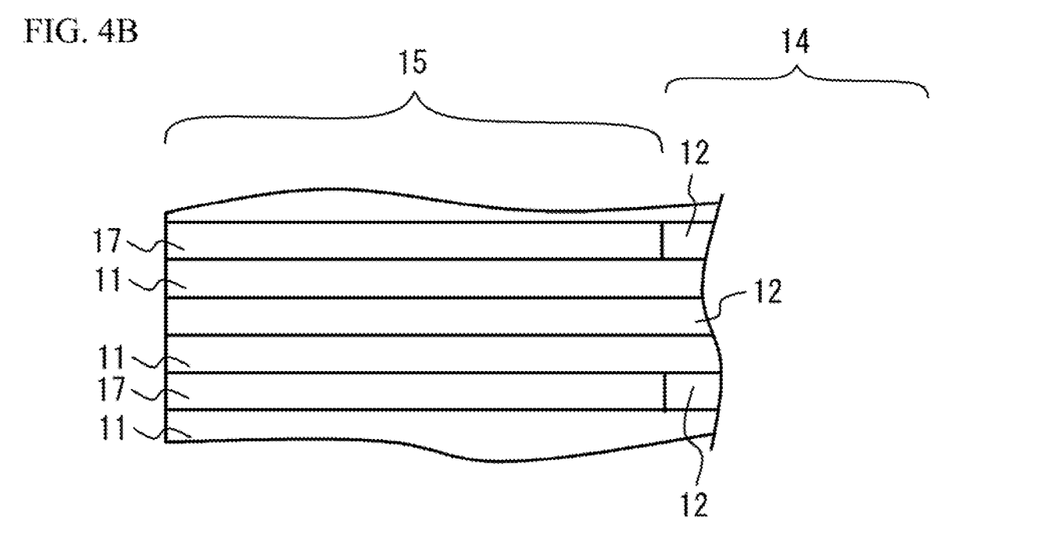
FIG. 4B illustrates an enlarged view of a cross section of an end margin region.

FIG. 4B illustrates an enlarged view of the cross section of the end margin region 15. Compared to the side margin region 16, in the end margin region 15, every other layer, the internal electrode layers 12 extends to the edge face of the end margin region 15. The reverse pattern layer 17 is not provided in a layer where the internal electrode layer 12 extends to the end face of the end margin region 15. Each of the dielectric layers 11 of the capacity region 14 is continuously formed with each of the dielectric layers 11 of the end margin region 15. With the structure, a level difference between the capacity region 14 and the end margin region 15 is suppressed.

The dielectric layer 11 is formed by firing raw material powder of which a main component ceramic has a perovskite structure. The raw material powder is exposed to reductive atmosphere during the firing. Therefore, oxygen defect occurs in the main component ceramic. And so, it is thought that Mo, Nb, Ta, W or the like acting as a donor is added to the dielectric layer 11 in order to displace the B site of the perovskite structure expressed by $ABO_3$ with the donor element. When the donor element is added to the dielectric layer 11, formation of the oxygen defect of the main component ceramic may be suppressed. Therefore, the life characteristic of the dielectric layer 11 is improved, the reliability is improved, a high dielectric constant is achieved, and preferable bias characteristic is achieved. However, when a large amount of the donor element is added to the reverse pattern layer 17, the structural defect caused by the delay of sintering may occur because of the abnormal grain growth at the surface of the multilayer chip 10 caused by the promotion of the grain growth of the main component ceramic or prevention of densifying caused by the abnormal grain growth. Alternatively, when a large amount of the donor element is added to the reverse pattern layer 17, the structural defect caused by spheroidizing of the internal electrode layer 12 near the reverse pattern layer 17 may occur because the grain growth of the reverse pattern layer 17 is promoted. Therefore, the reliability of the multilayer ceramic capacitor 100 may be degraded. For example, the humidity resistance is degraded because of the prevention of the densifying. Increasing of a short rate, reduction of the lifetime, reduction of BDV (Breakdown Voltage) or the like may occur because of the structural defect caused by the spheroidizing.

And so, in the embodiment, a donor element concentration in the reverse pattern layer 17 with respect to the main component ceramic of the reverse pattern layer 17 is lower than a donor concentration in the dielectric layer 11 with respect to the main component ceramic of the dielectric layer 11. With the structure, abnormal grain growth or delay of sintering at the surface of the multilayer chip 10 is suppressed. Thereby, structural defect is suppressed. Therefore, the reliability of the multilayer ceramic capacitor 100 is improved.

Because of diffusion of the donor element during the firing, the donor element concentration of the whole of the end margin region 15 and the side margin region 16 (hereinafter referred to as a margin region) with respect to the main component ceramic of the end margin region is lower than the donor element concentration of the dielectric layer 11 in the capacity region 14 with respect to the main component ceramic of the dielectric layer 11.

Next, during the firing, because of a difference between sintering characteristic of a metal and sintering characteristic of a ceramic material, a difference may occur in contraction in sintering between the internal electrode layer 12 and the reverse pattern layer 17. In concrete, the sintering characteristic of the internal electrode layer 12 is higher than the sintering characteristic of the reverse pattern layer 17. Therefore, a micro clearance may occur between the end of the internal electrode layer 12 and the reverse pattern layer 17. When a water component such as humidity intrudes into the clearance, humidity defect may occur. Thus, the reliability of the multilayer ceramic capacitor 100 may be degraded. In the description, when the sintering characteristic is high, a temperature at which the contraction (densifying) terminates is low.

And so, in the embodiment, a concentration of a sintering assistant of the reverse pattern layer 17 is higher than a concentration of a sintering assistant of the dielectric layer 11. In concrete, concentrations of Mn (manganese), Si (silicon) and B (boron) of the reverse pattern layer 17 are higher than concentrations of Mn, Si and B of the dielectric layer 11. With the structure, the sintering characteristic of the reverse pattern layer 17 gets higher. And, the difference of the contraction in sintering gets smaller between the reverse pattern layer 17 and the internal electrode layer 12. Therefore, the occurrence of the clearance between the end of the internal electrode layer 12 and the reverse pattern layer 17 is be suppressed. In this case, the intrusion of the water component is suppressed, and the humidity resistance is improved. Therefore, the life characteristic of the dielectric layer 11 is improved, and the reliability of the multilayer ceramic capacitor 100 is improved.

When Mn, Si and B diffuse from the reverse pattern layer 17 during the firing, the concentrations of Mn, Si and B of the whole of the end margin region 15 and the side margin region 16 are higher than those of the dielectric layer 11 in the capacity region 14. In this case, the difference of the contraction in sintering gets smaller between the end margin region 15 or the side margin region 16 and the capacity region 14.

When the donor element amount of the reverse pattern layer 17 is excessively large, the abnormal grain growth and the delay of sintering at the surface of the multilayer chip 10 may not be necessarily suppressed sufficiently. And so, it is preferable that the donor element concentration of the reverse pattern layer 17 has an upper limit. In the embodiment, as an example, when Mo is used as the donor element, it is preferable that the Mo concentration in the reverse pattern layer 17 with respect to the main component ceramic of the reverse pattern layer 17 is less than 0.2 atm %. It is more preferable that the Mo concentration is 0.1 atm % or less. In this case, the concentration (atm %) is a concentration on a presumption that a B site of the main component ceramic having the perovskite structure expressed by a general formula $ABO_3$ is 100 atm %. In the following description, the concentration (atm %) is a concentration on a presumption that a B site of the main component ceramic having the perovskite structure expressed by a general formula $ABO_3$ is 100 atm %.

In the embodiment, the donor element concentration in the end margin region 15 and the side margin region 16 with respect to the main component ceramic of the end margin region 15 and the side margin region 16 is lower than the donor element concentration in the dielectric layer 11 in the capacity region 14 with respect to the main component ceramic of the dielectric layer 11 in the capacity region 14. However, the relationship of the concentrations is not limited. For example, the donor element concentration in one of margin regions with respect to the main component ceramic of the one of margin regions may be lower than the donor element concentration in the dielectric layer 11 in the capacity region 14 with respect to the main component ceramic of the dielectric layer 11 in the capacity region 14.

Next, when a Mn amount in the reverse pattern layer 17 is excessively large, the capacity of the capacity region 14 may be reduced because of diffusion of Mn into the dielectric layer 11 in the capacity region 14. And so, it is preferable that the Mn concentration in the reverse pattern layer 17 has an upper limit. In the embodiment, as an example, it is preferable that the Mn concentration in the reverse pattern layer 17 is 2.5 atm % or less. On the other hand, when the Mn amount in the reverse pattern layer 17 is excessively small, high sintering characteristic is not achieved in the reverse pattern layer 17 and a clearance may occur between the end of the internal electrode layer 12 and the reverse pattern layer 17 because of grain growth. In this case, life characteristic of the dielectric layer 11 may be degraded. And so, it is preferable that the Mn concentration in the reverse pattern layer 17 has a lower limit. In the embodiment, as an example, it is preferable that the Mn concentration in the reverse pattern layer 17 is 0.5 atm % or more.

When a Si amount in the reverse pattern layer 17 is excessively large, a grain growth region of the reverse pattern layer 17 reaches near the end of the internal electrode layer 12 and a structural defect may occur in the internal electrode layer 12 because of stress in the internal electrode layer 12. In this case, the life characteristic may be degraded. And so, it is preferable that the Si concentration in the reverse pattern layer 17 has an upper limit. In the embodiment, as an example, it is preferable that the Si concentration in the reverse pattern layer 17 is 2.5 atm % or less. On the other hand, when the Si amount in the reverse pattern layer 17 is excessively small, high sintering characteristic is not achieved in the reverse pattern layer 17 and a clearance may occur between the end of the internal electrode layer 12 and the reverse pattern layer 17. In this case, life characteristic of the dielectric layer 11 may be degraded. And so, it is preferable that the Si concentration in the reverse pattern layer 17 has a lower limit. In the embodiment, as an example, it is preferable that the Si concentration in the reverse pattern layer 17 is 1.2 atm % or more.

When a B amount in the reverse pattern layer 17 is excessively large, the grain growth region of the reverse pattern layer 17 reaches near the end of the internal electrode layer 12 and a structural defect may occur in the internal electrode layer 12 because of stress in the internal electrode layer 12. In this case, the life characteristic may be degraded. And so, it is preferable that the B concentration in the reverse pattern layer 17 has an upper limit. In the embodiment, as an example, it is preferable that the B concentration in the reverse pattern layer 17 is 0.3 atm % or less. On the other hand, when the B amount in the reverse pattern layer 17 is excessively small, high sintering characteristic is not achieved in the reverse pattern layer 17 and a clearance may occur between the end of the internal electrode layer 12 and the reverse pattern layer 17. In this case, life characteristic of the dielectric layer 11 may be degraded. And so, it is preferable that the B concentration in the reverse pattern layer 17 has a lower limit. In the embodiment, as an example, it is preferable that the B concentration in the reverse pattern layer 17 is 0.15 atm % or more.

In the embodiment, the concentrations of Mn, Si and B in the end margin region 15 and the side margin region 16 are higher than the concentrations of Mn, Si and B in the dielectric layer 11 in the capacity region 14. However, the relationship of the concentrations is not limited. For example, the concentrations of Mn, Si and B in one of margin regions may be higher than the concentrations of Mn, Si and B in the dielectric layer 11 in the capacity region 14.

Figure 5:
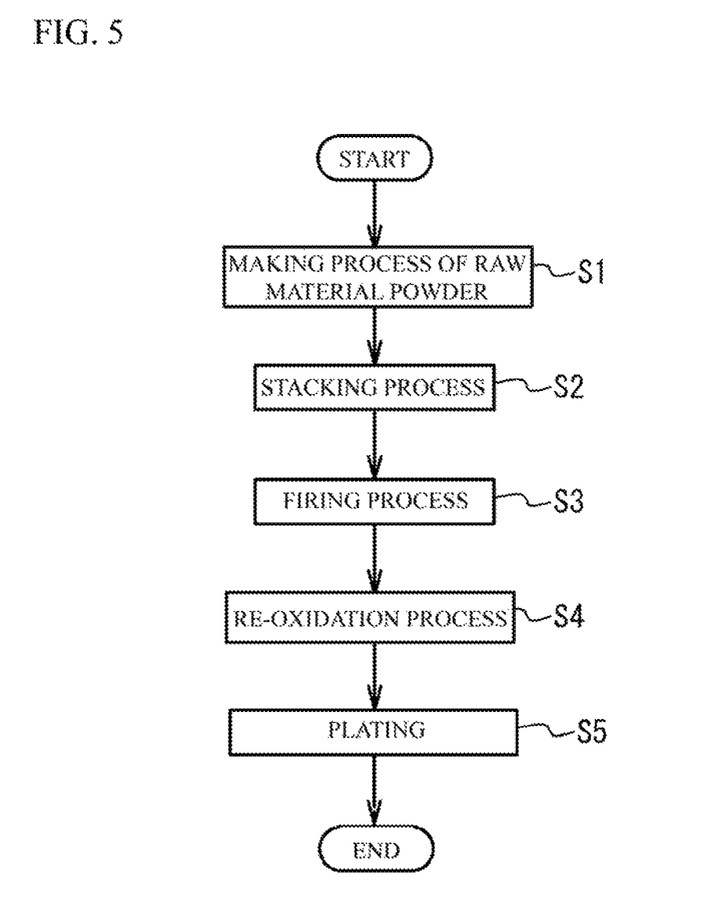
FIG. 5 illustrates a manufacturing method of a multilayer ceramic capacitor.

Next, a description will be given of a manufacturing method of the multilayer ceramic capacitor 100. FIG. 5 illustrates a manufacturing method of the multilayer ceramic capacitor 100.

(Making process of raw material powder) A dielectric material for forming the dielectric layer 11 is prepared as illustrated in FIG. 5. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiment may use any of these methods.

An additive compound may be added to resulting ceramic powders, in accordance with purposes. The additive compound may be an oxide of Mn, V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Li (lithium), B, Na (sodium), K (potassium) and Si, or glass. In the embodiment, at least one of donor elements is added to the resulting ceramic powders. And, in the embodiment, at least Me source, Si source and B source are added to the resulting ceramic powder.

In the embodiment, it is preferable that ceramic particles structuring the dielectric layer 11 are mixed with compound including additives and are calcined in a temperature range from 820 degrees C. to 1150 degrees C. Next, the resulting ceramic particles are wet-blended with additives, are dried and crushed. Thus, ceramic powder is obtained. For example, it is preferable that an average grain diameter of the resulting ceramic powder is 50 nm to 300 nm from a viewpoint of thickness reduction of the dielectric layer 11. The grain diameter may be adjusted by crushing the resulting ceramic powder as needed. Alternatively, the grain diameter of the resulting ceramic power may be adjusted by combining the crushing and classifying.

Next, a reverse pattern material for forming the end margin region 15 and the side margin region 16 is prepared. An additive compound may be added to ceramic powder obtained by the same process as the dielectric material, in accordance with purposes. The additive compound may be an oxide of Mn, V, Cr or a rare earth element (Y, Sm, Eu, Gd, Tb, Dy, Ho, Er, Tm and Yb), or an oxide of Co, Ni, Li, B, Na, K and Si, or glass. In the embodiment, the donor element is not added to the resulting ceramic powders. Alternatively, an amount of the donor element added to the resulting ceramic powders is less than an amount of the donor element added to the dielectric material. Moreover, in the embodiment, at least the Mn source, the Si source and the B source are added to the resulting ceramic powder. The added amount of Mn, Si and B to the resulting ceramic powder are larger than the added amount of Mn, Si and B to the dielectric material.

In the embodiment, it is preferable that ceramic particles structuring the end margin region 15 and the side margin region 16 are mixed with compound including additives and are calcined in a temperature range from 820 degrees C. to 1150 degrees C. Next, the resulting ceramic particles are wet-blended with additives, are dried and crushed. Thus, ceramic powder is obtained. For example, it is preferable that an average grain diameter of the resulting ceramic powder is 50 nm to 300 nm, as well as the dielectric material. The grain diameter may be adjusted by crushing the resulting ceramic powder as needed. Alternatively, the grain diameter of the resulting ceramic power may be adjusted by combining the crushing and classifying.

(Stacking process) Next, a binder such as polyvinyl butyral (PVB) resin, an organic solvent such as ethanol or toluene, and a plasticizer are added to the resulting dielectric material and wet-blended. With use of the resulting slurry, a strip-shaped dielectric green sheet with a thickness of 0.8 μm or less is coated on a base material by, for example, a die coater method or a doctor blade method, and then dried.

Then, a pattern (first pattern) of the internal electrode layer 12 is provided on the surface of the dielectric green sheet by printing metal conductive pastes for forming an internal electrode with use of screen printing or gravure printing. The conductive pastes include an organic binder. A plurality of patterns are alternatively exposed to the pair of external electrodes. As co-materials, ceramic particles are added to the metal conductive pastes. A main component of the ceramic particles is not limited. However, it is preferable that the main component of the ceramic particles is the same as that of the dielectric layer 11. For example, $BaTiO_3$ of which an average particle size is 50 nm or less is evenly dispersed.

Next, a binder and an organic solvent are added to the reverse pattern material. The binder is such as ethyl cellulose. The organic solvent is such as terpineol. And the reverse pattern material is kneaded with the binder and the organic solvent by a roll mill. Thus, a reverse pattern pastes are obtained. The reverse pattern paste is printed on a circumference area of the dielectric green sheet. The circumference area is a part of the dielectric green sheet where the internal electrode layer pattern is not printed. The reverse pattern acts as a reverse pattern (second pattern). Therefore, a level difference caused by the internal electrode layer pattern is buried.

Then, the dielectric green sheet on which the internal electrode layer pattern and the reverse pattern are printed is stamped into a predetermined size, and a predetermined number (for example, 100 to 500) of stamped dielectric green sheets are stacked while the base material is peeled so that the internal electrode layers 12 and the dielectric layers 11 are alternated with each other and the end edges of the internal electrode layers 12 are alternately exposed to both end faces in the length direction of the dielectric layer 11 so as to be alternately led out to a pair of external electrodes 20a and 20b of different polarizations. Cover sheets, which are to be the cover layers 13, are stacked on the stacked dielectric green sheets and under the stacked dielectric green sheets. The resulting compact is cut into a predetermined size (for example, 1.0 mm×0.5 mm). After that the binder is removed in $N_2$ atmosphere in a temperature range from 250 degrees C. to 500 degrees C. After that, metal conductive paste to be the external electrodes 20a and 20b are coated on the both end faces of the cut multilayer structure and are dried. Thus, a compact of the multilayer ceramic capacitor 100 is obtained.

(Firing process) The resulting compact is fired for ten minutes to 2 hours in a reductive atmosphere having an oxygen partial pressure of $10^{-5}$ to $10^{-8}$ atm in a temperature range of 1100 degrees C. to 1300 degrees C. Thus, each compound of the dielectric green sheet is sintered and grown into grains. In this manner, it is possible to manufacture the multilayer ceramic capacitor 100.

(Re-oxidizing process) After that, a re-oxidizing process may be performed in $N_2$ gas atmosphere in a temperature range of 600 degrees C. to 1000 degrees C.

(Plating process) After that, with a plating process, a metal such as Cu, Ni, and Sn may be coated on the external electrodes 20a and 20b.

In the manufacturing method of the embodiment, the donor element concentration of the reverse pattern material with respect to the main component ceramic of the reverse pattern material is lower than the donor concentration of the dielectric material with respect to the main component ceramic of the dielectric material. In this case, abnormal grain growth or delay of sintering at the surface of the multilayer chip 10 is suppressed. Thereby, structural defect is suppressed. Therefore, the reliability of the multilayer ceramic capacitor 100 is improved.

In the manufacturing method of the embodiment, the concentrations of Mn, Si and B of the reverse pattern material with respect to the main component ceramic of the reverse pattern material are higher than the concentrations of Mn, Si and B of the dielectric material with respect to the main component ceramic of the dielectric material. In this case, the sintering characteristic of the reverse pattern layer 17 gets higher. And, the difference of the contraction in sintering gets smaller between the reverse pattern layer 17 and the internal electrode layer 12. That is, the difference of the contraction in sintering gets smaller between the end margin region 15 or the side margin region 16, and the capacity region 14. Therefore, the occurrence of the clearance between the end of the internal electrode layer 12 and the reverse pattern layer 17 is suppressed. In this case, the intrusion of the water component is suppressed, and the humidity resistance is improved. Therefore, the life characteristic of the dielectric layer 11 is improved, and the reliability of the multilayer ceramic capacitor 100 is improved.

When the donor element amount of the reverse pattern material is excessively large, the abnormal grain growth and the delay of sintering at the surface of the multilayer chip 10 may not be necessarily suppressed sufficiently. And so, it is preferable that the donor element concentration of the reverse pattern material has an upper limit. In the embodiment, as an example, when Mo is used as the donor element, it is preferable that the Mo concentration of the reverse pattern material with respect to the main component ceramic of the reverse pattern material is less than 0.2 atm %. It is more preferable that the Mo concentration is 0.1 atm % or less. It is still more preferable that the Mo concentration is zero.

Next, when the Mn amount in the reverse pattern material with respect to the main component ceramic of the reverse pattern material is excessively large, the capacity of the capacity region 14 may be reduced because of diffusion of Mn into the dielectric layer 11 in the capacity region 14. And so, it is preferable that the Mn concentration in the reverse pattern material with respect to the main component ceramic of the reverse pattern material has an upper limit. In the embodiment, as an example, it is preferable that the Mn concentration in the reverse pattern material is 2.5 atm % or less. On the other hand, when the Mn amount in the reverse pattern material with respect to the main component ceramic of the reverse pattern material is excessively small, high sintering characteristic is not achieved in the reverse pattern layer 17 and a clearance may occur between the end of the internal electrode layer 12 and the reverse pattern layer 17 because of grain growth. In this case, life characteristic of the dielectric layer 11 may be degraded. And so, it is preferable that the Mn concentration in the reverse pattern material with respect to the main component ceramic of the reverse pattern material has a lower limit. In the embodiment, as an example, it is preferable that the Mn concentration in the reverse pattern material is 0.5 atm % or more. From a viewpoint of achieving both preferable capacity and preferable life characteristic of the dielectric layer 11, it is preferable that the Mn concentration in the reverse pattern material is 2.25 atm %±0.25 atm %.

When the Si amount in the reverse pattern material with respect to the main component ceramic of the reverse pattern material is excessively large, the grain growth region of the reverse pattern layer 17 reaches near the end of the internal electrode layer 12 and the structural defect may occur in the internal electrode layer 12 because of stress in the internal electrode layer 12. In this case, the life characteristic may be degraded. And so, it is preferable that the Si concentration in the reverse pattern material with respect to the main component ceramic of the reverse pattern material has an upper limit. In the embodiment, as an example, it is preferable that the Si concentration in the reverse pattern material with respect to the main component ceramic of the reverse pattern material is 2.5 atm % or less. On the other hand, when the Si amount in the reverse pattern material with respect to the main component ceramic of the reverse pattern material is excessively small, high sintering characteristic is not achieved in the reverse pattern layer 17 and a clearance may occur between the end of the internal electrode layer 12 and the reverse pattern layer 17. In this case, life characteristic of the dielectric layer 11 may be degraded. And so, it is preferable that the Si concentration in the reverse pattern material with respect to the main component ceramic of the reverse pattern material has a lower limit. In the embodiment, as an example, it is preferable that the Si concentration in the reverse pattern material is 1.5 atm % or more. From a viewpoint of achieving both suppression of grain growth and preferable sintering characteristic of the reverse pattern layer 17, it is preferable that the Si concentration in the reverse pattern material is 2.25 atm %±0.25 atm %.

When the B amount in the reverse pattern material with respect to the main component ceramic of the reverse pattern material is excessively large, the grain growth region of the reverse pattern layer 17 reaches near the end of the internal electrode layer 12 and a structural defect may occur in the internal electrode layer 12 because of stress in the internal electrode layer 12. In this case, the life characteristic may be degraded. And so, it is preferable that the B concentration in the reverse pattern material with respect to the main component ceramic of the reverse pattern material has an upper limit. In the embodiment, as an example, it is preferable that the B concentration in the reverse pattern material with respect to the main component ceramic of the reverse pattern material is 0.3 atm % or less. On the other hand, when the B amount in the reverse pattern material with respect to the main component ceramic of the reverse pattern material is excessively small, high sintering characteristic is not achieved in the reverse pattern layer 17 and a clearance may occur between the end of the internal electrode layer 12 and the reverse pattern layer 17. In this case, life characteristic of the dielectric layer 11 may be degraded. And so, it is preferable that the B concentration in the reverse pattern material with respect to the main component ceramic of the reverse pattern material has a lower limit. In the embodiment, as an example, it is preferable that the B concentration in the reverse pattern material is 0.2 atm % or more. From a viewpoint of achieving both suppression of grain growth and preferable sintering characteristic, it is preferable that the B concentration in the reverse pattern material is 0.25 atm %±0.05 atm %.

EXAMPLES

The multilayer ceramic capacitors in accordance with the embodiment were made and the property was measured.

Examples 1 to 11

(Making of the dielectric material) $MoO_3$, $Ho_2O_3$, $MnCO_3$, $SiO_2$ and $B_2O_3$ were weighed so that the Mo concentration, the Ho concentration, the Mn concentration, the Si concentration and the B concentration with respect to 100 atm % of barium titanate powder (an average grain diameter of 0.1 μm) were respectively 0.20 atm %, 0.75 atm %, 0.08 atm %, 1.15 atm % and 0.13 atm %. And the barium titanate powder was sufficiently wet-blended with $MoO_3$, $Ho_2O_3$, $MnCO_3$, $SiO_2$ and $B_2O_3$ and crushed with a ball mill. Thus, the dielectric material was obtained.

(Making of the reverse pattern material) In the examples 1 to 11, $Ho_2O_3$ was weighed so that the Ho concentration with respect to 100 atm % of barium titanate powder (an average grain diameter of 0.1 μm) was 0.75 atm %. In the example 11, $MoO_3$ was weighed so that the Mo concentration in the reverse pattern material was 0.10 atm %. $MnCO_3$ was weighed so that the Mn concentration in the reverse pattern material was 2.25 atm % in the example 1, 2.00 atm % in the example 2, 2.50 atm % in the example 3, 3.00 atm % in the example 4, 2.25 atm % in the examples 5 to 11. $SiO_2$ was weighed so that the Si concentration in the reverse pattern material was 2.00 atm % in the examples 1 to 4, 1.50 atm % in the example 5, 2.50 atm % in the example 6, 3.00 atm % in the example 7, 2.00 atm % in the examples 8 to 11. $B_2O_3$ was weighed so that the B concentration in the reverse pattern material was 0.25 atm % in the example 1 to 7, 0.20 atm % in the example 8, 0.30 atm % in the example 9, 0.50 atm % in the example 10, 0.25 atm % in the example 11. After that, the barium titanate powder was sufficiently wet-blended with $MoO_3$, $Ho_2O_3$, $MnCO_3$, $SiO_2$ and $B_2O_3$ and crushed with a ball mill. Thus, the reverse pattern material was obtained.

(Making of reverse pattern paste) As the organic binder, ethyl cellulose was added to the reverse pattern material. As a solvent, terpineol was added to the reverse pattern material. And the reverse pattern material, the organic binder and the solvent were kneaded by a roll mill. Thus, the reverse pattern paste was obtained.

(Making of a multilayer ceramic capacitor) Butyral acting as an organic binder, and toluene and ethyl alcohol acting as a solvent were added to the dielectric material. A dielectric green sheet was formed by a doctor blade method so that the thickness of the green sheet was 1.2 μm. Conductive paste for forming an internal electrode was screen-printed on the resulting green sheet. The reverse pattern paste was screen-printed on a part of the green sheet where the conductive paste was not printed. Thus, the level difference was suppressed. 250 numbers of the sheets on which the conductive paste for forming an internal electrode and the reverse pattern material were printed were stacked. Cover sheets having a thickness of 30 μm were stacked on a lower face and an upper face of the stacked sheets. After that, a multilayer structure was obtained by a thermo compression bonding. And the resulting multilayer structure was cut into a predetermined shape. The binder was removed in $N_2$ atmosphere. Ni external electrodes were formed on the resulting multilayer structure by a dip method. The resulting multilayer structure was fired at 1250 degrees C. in a reductive atmosphere ($O_2$ partial pressure: $10^{-5}$ to $10^{-8}$ atm). And sintered multilayer structure was formed. A length was 0.6 mm. A width was 0.3 mm. A height was 0.3 mm. The sintered multilayer structure was re-oxidized in a $N_2$ atmosphere at 800 degrees C. After that, metals of Cu, Ni and Sn were coated on a surface of external electrode terminals by plating. And, a multilayer ceramic capacitor was formed. After firing, the thickness of the Ni internal electrode layers 12 was 1.0 μm.

Comparative Example 1

In the comparative example 1, in the making process of the reverse pattern material, $Ho_2O_3$, $MnCO_3$, $SiO_2$ and $B_2O_3$ were weighed so that the Ho concentration, the Mn concentration, the Si concentration and the B concentration with respect to 100 atm % of barium titanate powder (an average grain diameter of 0.1 μm) were respectively 0.75 atm %, 2.25 atm %, 1.00 atm % and 0.25 atm %. Other conditions were the same as the examples 1 to 11.

Comparative Example 2

In the comparative example 2, in the making process of the reverse pattern material, $Ho_2O_3$, $MnCO_3$, $SiO_2$ and $B_2O_3$ were weighed so that the Ho concentration, the Mn concentration, the Si concentration and the B concentration with respect to 100 atm % of barium titanate powder (an average grain diameter of 0.1 μm) were respectively 0.75 atm %, 2.25 atm %, 2.00 atm % and 0.10 atm %, Other conditions were the same as the examples 1 to 11.

(Analysis) A HALT (Highly Accelerated Limit Test) defect rate and a capacity acquisition rate were measured with respect to the examples 1 to 11 and the comparative examples 1 and 2. HALT tests of 125 degrees C.-15 Vdc-120 min-100 numbers were performed. Samples whose short defect rate was less than 10% were determined as acceptance (○). Samples whose short defect rate was less than 20% and 10% or more were determined as (Δ). Samples whose short defect rate was 20% or more were determined as not acceptance (×). A capacity was measured by an LCR meter in the measuring of the capacity acquisition rate.

Measured values were compared with a design value that was calculated from a dielectric constant of a dielectric material (a dielectric constant was calculated by making a disc-shaped sintered material having a size of $\phi=10$ mm×T=1 mm from only a dielectric material in advance and measuring a capacitance), a crossing area of internal electrodes, a thickness of a dielectric ceramic layer and stack number. When a capacity acquisition rate (measured value/design value×100) was 90% to 105%, it was determined as acceptance (○). When the capacity acquisition rate was less than 90% was determined as triangle (Δ).

Table 1 shows measured results. In the examples 1 to 11, the HALT defect rate was less than 20%. It is thought that this was because: the lifetime of the dielectric layer 11 got longer, the abnormal grain growth or the delay of sintering at the surface of the multilayer chip 10 was suppressed and the structural defect was suppressed because the Mo concentration in the reverse pattern material with respect to the main component ceramic of the reverse pattern material was lower than the Mo concentration in the dielectric material with respect to the main component ceramic of the dielectric material; and the sintering characteristic of the reverse pattern layer 17 got higher and the difference of contraction in sintering between the reverse pattern layer 17 and the internal electrode layer 12 was reduced because the concentrations of Mn, Si and B of the reverse pattern material were higher than the concentrations of Mn, Si and B of the dielectric material. On the other hand, in the comparative examples 1 and 2, the HALT defect rate was 20% or more. It is thought that this was because the sintering characteristic of the reverse pattern layer 17 got lower and the difference of contraction in sintering between the reverse pattern layer 17 and the internal electrode layer 12 was not sufficiently reduced because the Si concentration in the reverse pattern material was lower than the Si concentration in the dielectric material, in the comparative example 1. It is thought that this was because the sintering characteristic of the reverse pattern layer 17 got lower and the difference of contraction in sintering between the reverse pattern layer 17 and the internal electrode layer 12 was not sufficiently reduced because the B concentration in the reverse pattern material was lower than the B concentration in the dielectric material, in the comparative example 2.

TABLE 1

| | | COMPOSITION [atm %] | | | | | HALT DEFECT RATE [%] | | CAPACITY ACQUISITION RATE [%] | |
|---|---|---|---|---|---|---|---|---|---|---|
| | | Mo | Ho | Mn | Si | B | | | | |
| DIELECTRIC MATERIAL | | 0.20 | 0.75 | 0.08 | 1.15 | 0.13 | | | | |
| EXAMPLE 1 | REVERSE | 0.00 | 0.75 | 2.25 | 2.00 | 0.25 | 1 | ○ | 100 | ○ |
| EXAMPLE 2 | PATTERN | 0.00 | 0.75 | 2.00 | 2.00 | 0.25 | 4 | ○ | 101 | ○ |
| EXAMPLE 3 | MATERIAL | 0.00 | | 2.50 | | | 2 | ○ | 95 | ○ |
| EXAMPLE 4 | | 0.00 | | 3.00 | | | 0 | ○ | 88 | Δ |
| EXAMPLE 5 | | 0.00 | 0.75 | 2.25 | 1.50 | 0.25 | 7 | ○ | 102 | ○ |
| EXAMPLE 6 | | 0.00 | | | 2.50 | | 3 | ○ | 98 | ○ |
| EXAMPLE 7 | | 0.00 | | | 3.00 | | 12 | Δ | 96 | ○ |
| EXAMPLE 8 | | 0.00 | 0.75 | 2.25 | 2.00 | 0.20 | 6 | ○ | 102 | ○ |
| EXAMPLE 9 | | 0.00 | | | | 0.30 | 4 | ○ | 97 | ○ |
| EXAMPLE 10 | | 0.00 | | | | 0.50 | 17 | Δ | 98 | ○ |
| EXAMPLE 11 | | 0.10 | 0.75 | 2.25 | 2.00 | 0.25 | 3 | ○ | 97 | ○ |
| COMPARATIVE EXAMPLE 1 | REVERSE PATTERN | 0.00 | 0.75 | 2.25 | 1.00 | 0.25 | 20 | × | 103 | ○ |
| COMPARATIVE EXAMPLE 2 | MATERIAL | 0.00 | 0.75 | 2.25 | 2.00 | 0.10 | 29 | × | 104 | ○ |

The capacity acquisition rates of the examples 1 to 3 were higher than the capacity acquisition rate of the example 4.

From the result, it is thought that the diffusion of Mn into the dielectric layer 11 was suppressed because the Mn concentration in the reverse pattern material was 2.5 atm % or less.

The HALT defect rates of the examples 1, 5 and 6 were lower than the HALT defect rate of the example 7. From the result, it is thought that the grain growth of the reverse pattern layer 17 was suppressed because the Si concentration in the reverse pattern material was 2.5 atm % or less. And from the result that the HALT defect rates of the examples 1 and 5 to 7 were low, it is thought that high sintering characteristic was achieved in the reverse pattern layer 17 because the Si concentration in the reverse pattern material was 1.5 atm % or more.

The HALT defect rates of the examples 1, 8 and 9 were lower than the HALT defect rate of the example 10. From the result, it is thought that the grain growth in the reverse pattern layer 17 was suppressed because the B concentration in the reverse pattern material was 0.3 atm % or less. And, from the result that the HALT defect rates of the examples 1 and 8 to 10 were low, it is thought that high sintering characteristic was achieved in the reverse pattern layer 17 because the B concentration in the reverse pattern material was 0.2 atm % or more.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
   a multilayer structure in which each of a plurality of dielectric layers and each of a plurality of internal electrode layers are alternately stacked, a main component of the dielectric layers being ceramic, the multilayer structure having a rectangular parallelepiped shape, the plurality of internal electrode layers being alternately exposed to a first end face and a second end face of the multilayer structure, the first end face facing with the second end face,
   wherein concentrations of Mn, Si and B of a margin region with respect to a main component ceramic of the margin region are respectively higher than concentrations of Mn, Si and B of the dielectric layers in the multilayer structure with respect to a main component ceramic of the dielectric layers in the multilayer structure,
   wherein a donor element concentration of the margin region with respect to the main component ceramic of the margin region is lower than a donor element concentration of the dielectric layers in the multilayer structure with respect to the main component ceramic of the dielectric layers in the multilayer structure,
   wherein the margin region is at least one of an end margin region and a side margin region,
   wherein, in the multilayer structure, the end margin region is a region in which internal electrode layers exposed to the first end face are facing with each other without sandwiching an internal electrode layer exposed to the second end face and a region in which internal electrode layers exposed to the second end face are facing with each other without sandwiching an internal electrode layer exposed to the first end face,
   wherein, in the multilayer structure, the side margin is a region covering edge portions to which the plurality of internal electrode layers extend toward two side faces other than the first end face and the second end face.

2. The multilayer ceramic capacitor as claimed in claim 1, wherein the donor element is Mo.

3. The multilayer ceramic capacitor as claimed in claim 1, wherein the main component ceramic of the margin region and the main component ceramic of the dielectric layers in the multilayer structure are barium titanate.

4. The multilayer ceramic capacitor as claimed in claim 1, wherein a main component of the internal electrode layers is nickel.

5. A manufacturing method of a multilayer ceramic capacitor comprising:
   a first process of providing a first pattern of metal conductive paste, on a green sheet including main component ceramic grains;
   a second process of making a stack unit by providing a second pattern of main component ceramic grains, around the first pattern on the green sheet; and
   a third process of stacking a plurality of the stack units formed in the second process so that positions of the first patterns are alternately shifted to each other and firing a ceramic multilayer structure of the stack units,
   wherein concentrations of Mn, Si and B of the second pattern with respect to a main component ceramic of the second pattern are respectively higher than concentrations of Mn, Si and B of the green sheet with respect to a main component ceramic of the green sheet,
   wherein a donor element concentration of the second pattern with respect to the main component ceramic of the second pattern is lower than a donor element concentration of the green sheet with respect to the main component ceramic of the green sheet.

6. The method as claimed in claim 5, wherein the donor element is Mo.

7. The method as claimed in claim 6, wherein a Mo concentration of the second pattern with respect to a main component ceramic of the second pattern is less than 0.2 atm %.

8. The method as claimed in claim 5, wherein a Mn concentration of the second pattern with respect to a main component ceramic of the second pattern is 0.5 atm % or more and 2.5 atm % or less.

9. The method as claimed in claim 5, wherein a Si concentration of the second pattern with respect to a main component ceramic of the second pattern is 1.5 atm % or more and 2.5 atm % or less.

10. The method as claimed in claim 5, wherein a B concentration of the second pattern with respect to a main component ceramic of the second pattern is 0.2 atm % or more and 0.3 atm % or less.

11. The method as claimed in claim 5, wherein a main component ceramic of the green sheet and the second pattern is barium titanate.

12. The method as claimed in claim 5, wherein a main component metal of the first pattern is nickel.

* * * * *